United States Patent
Matsuoka et al.

(10) Patent No.: US 10,943,737 B2
(45) Date of Patent: Mar. 9, 2021

(54) FILM CAPACITOR, CAPACITOR UNIT, AND FILM CAPACITOR PRODUCTION METHOD

(71) Applicant: Panasonic Intellectual Property Management Co., Ltd., Osaka (JP)

(72) Inventors: Hidekazu Matsuoka, Kyoto (JP); Wataru Hitomi, Osaka (JP); Toshihisa Miura, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 177 days.

(21) Appl. No.: 16/248,833

(22) Filed: Jan. 16, 2019

(65) Prior Publication Data

US 2019/0148077 A1 May 16, 2019

Related U.S. Application Data

(63) Continuation of application No. PCT/JP2017/024928, filed on Jul. 7, 2017.

(30) Foreign Application Priority Data

Jul. 29, 2016 (JP) .............................. JP2016-149207

(51) Int. Cl.
*H01G 4/32* (2006.01)
*H01G 4/18* (2006.01)
(Continued)

(52) U.S. Cl.
CPC .................. *H01G 4/32* (2013.01); *H01G 4/18* (2013.01); *H01G 4/224* (2013.01); *H01G 4/228* (2013.01); *H01G 4/38* (2013.01)

(58) Field of Classification Search
CPC ............ H01G 4/32; H01G 4/18; H01G 4/224; H01G 4/228; H01G 4/38
See application file for complete search history.

(56) References Cited

U.S. PATENT DOCUMENTS 4,363,162 A * 12/1982 Price ........................ H01G 4/32
250/492.1

FOREIGN PATENT DOCUMENTS

JP       2015-103777       6/2015
WO       WO-2013069485 A1 *  5/2013 ............... H01G 4/18

OTHER PUBLICATIONS

International Search Report of PCT application No. PCT/JP2017/024928 dated Oct. 10, 2017.

* cited by examiner

*Primary Examiner* — David M Sinclair
(74) *Attorney, Agent, or Firm* — McDermott Will and Emery LLP

(57) ABSTRACT

Film capacitor is formed by winding first metal layer, first film, second metal layer, and second film that are in a stacked state in this order. In film surfaces of first and second films, an orientation angle α of first film and an orientation angle β of second film are different in sign from each other when a sign of the orientation angle which represents rotation from reference direction RD to one of both end surfaces is defined to be positive, and the sign of the orientation angle which represents rotation from reference direction RD to another of both end surfaces is defined to be negative. Here, the orientation angle is defined by an acute angle between an orientation main axis MA between reference direction RD parallel to first and second end surfaces when portions of first and second films facing each other through second metal layer are viewed in a direction perpendicular to the film surfaces.

4 Claims, 16 Drawing Sheets

(51) Int. Cl.
*H01G 4/38* (2006.01)
*H01G 4/224* (2006.01)
*H01G 4/228* (2006.01)

SECTIONAL VIEW ALONG LINE A-A'

METAL DEPOSITING PROCESS

FILM WINDING PROCESS

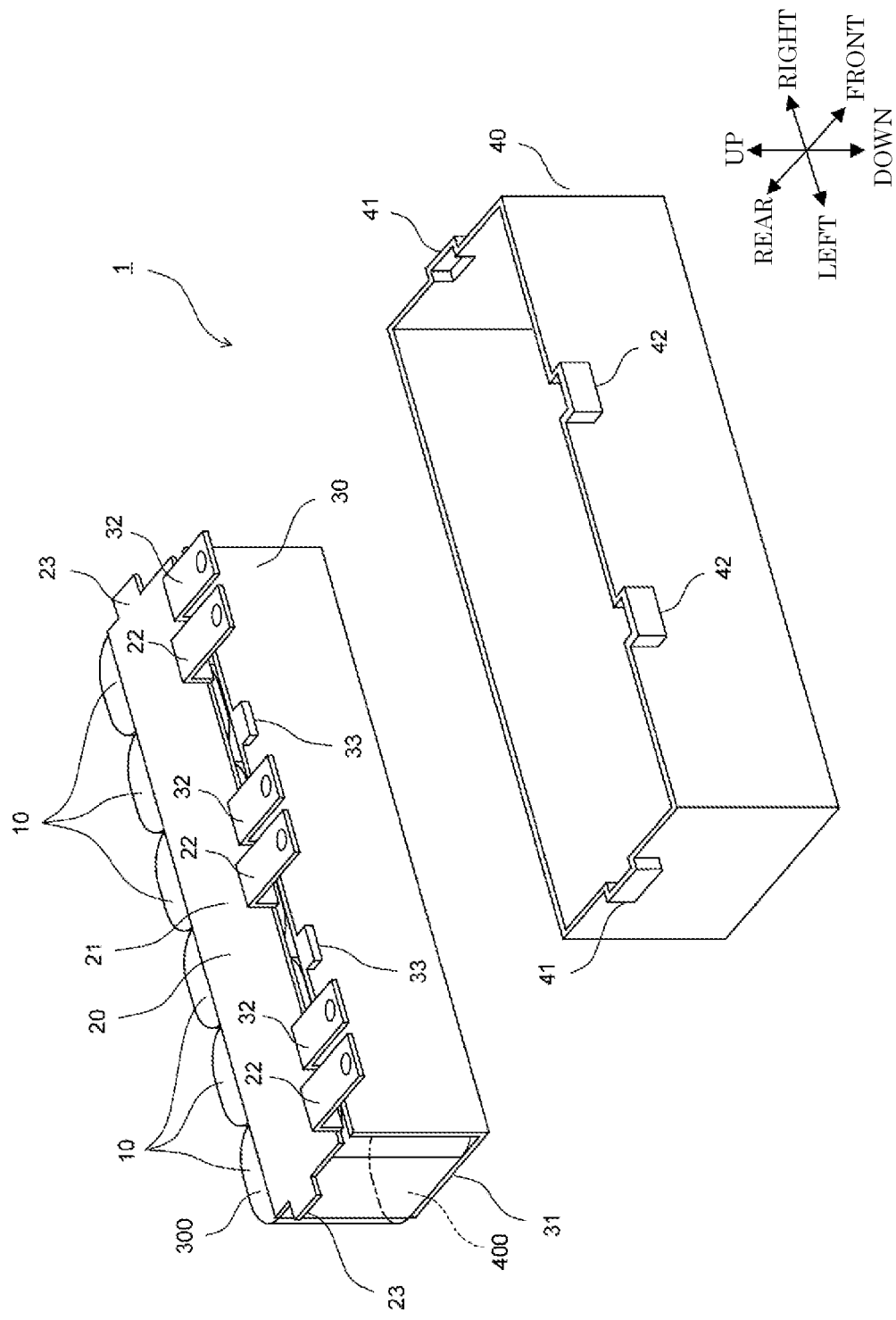

FIRST STRIP

FOURTH STRIP

SEVENTH STRIP

FIRST STRIP + SEVENTH STRIP

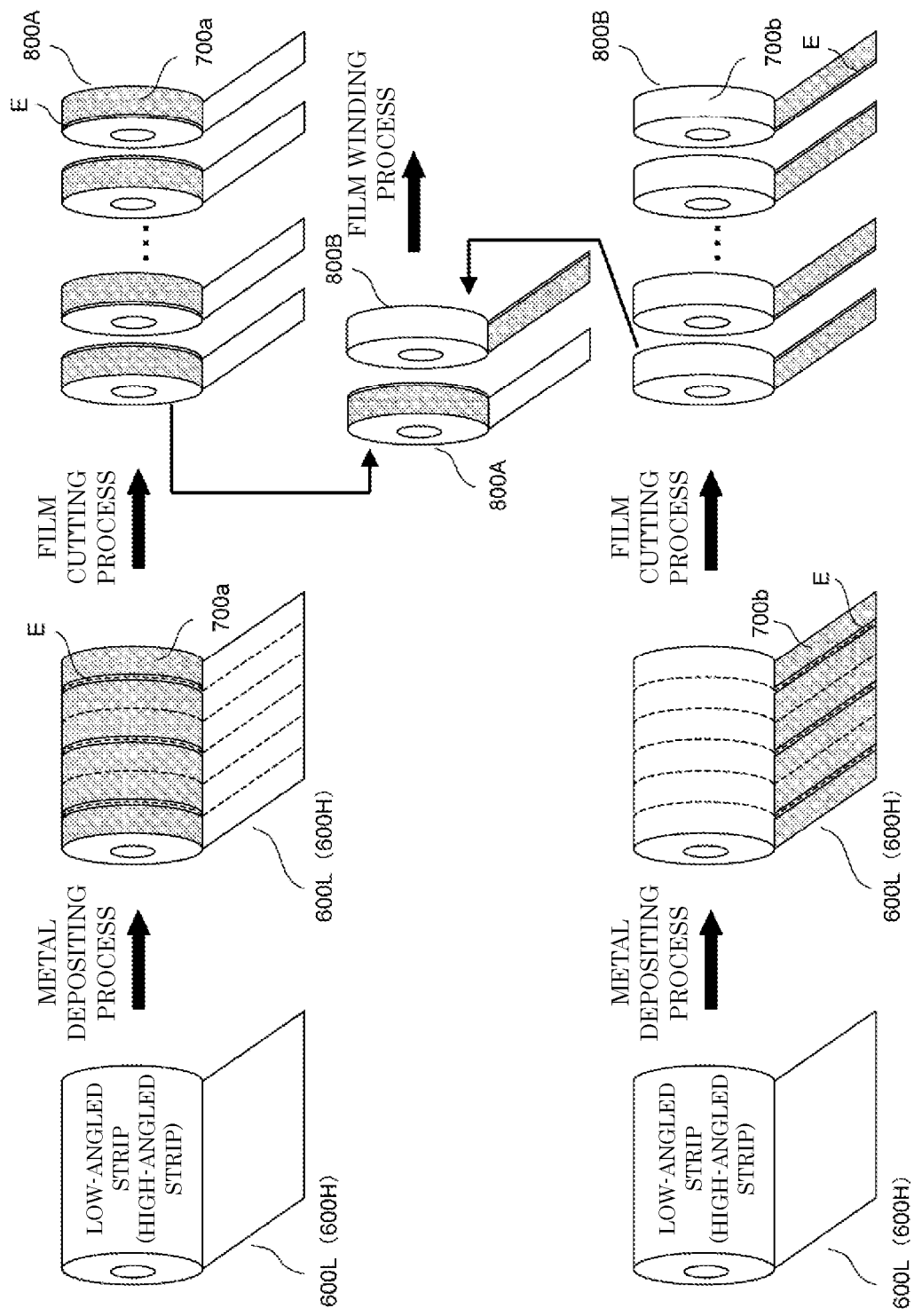

FILM WINDING PROCESS

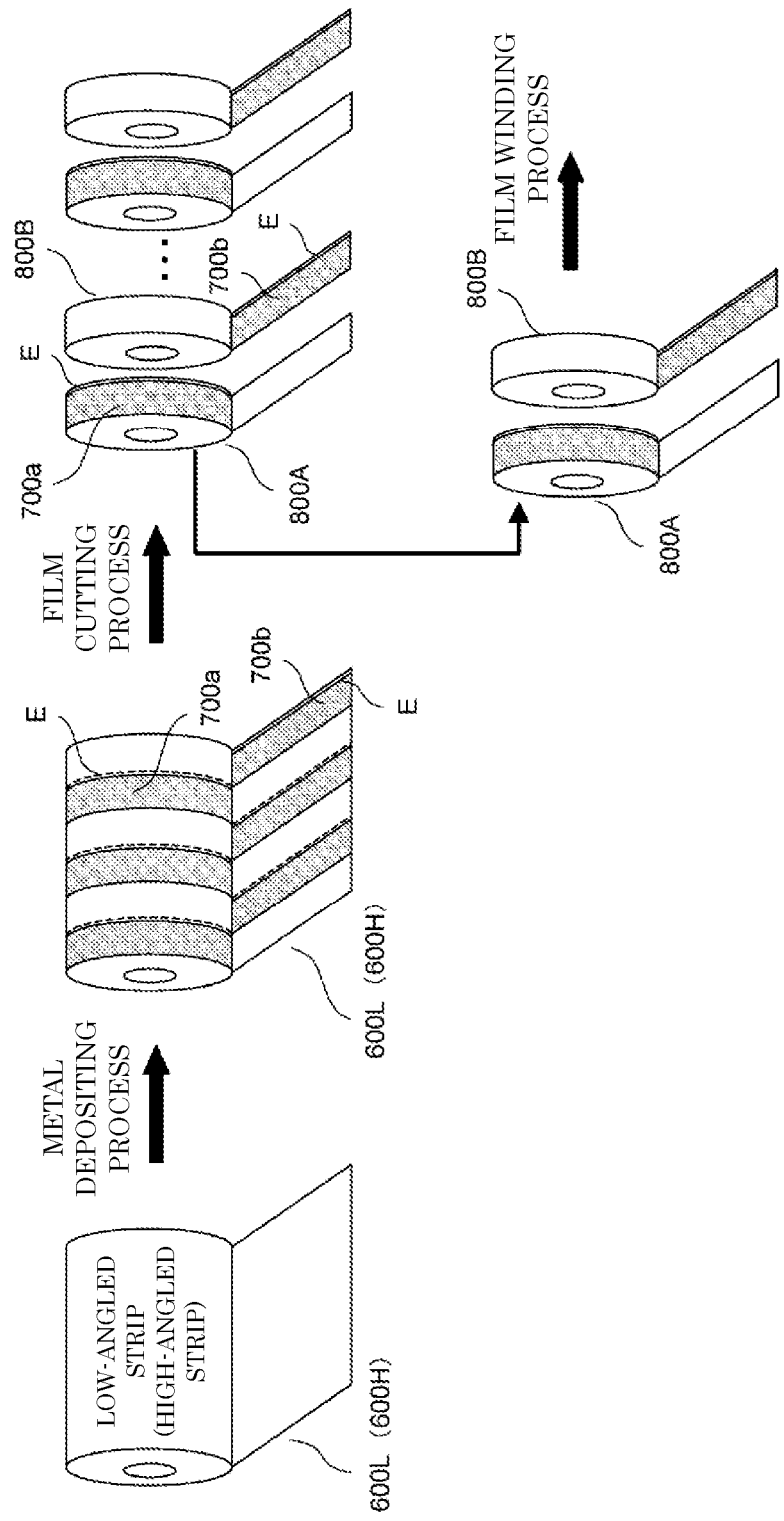

FILM CAPACITOR, CAPACITOR UNIT, AND FILM CAPACITOR PRODUCTION METHOD

RELATED APPLICATIONS

This application is a continuation of the PCT International Application No. PCT/JP2017/024928 filed on Jul. 7, 2017, which claims the benefit of foreign priority of Japanese patent application No. 2016-149207 filed on Jul. 29, 2016, the contents all of which are incorporated herein by reference.

TECHNICAL FIELD

The present invention relates to a film capacitor, and a method for producing the film capacitor. Furthermore, the present invention relates to a film capacitor unit with the film capacitor accommodated in a case.

BACKGROUND

Conventionally, there has been a known metallized film capacitor (capacitor unit) configured such that a plurality of capacitor elements (film capacitors) connected to external lead-out terminals (bus bars) are accommodated in a case whose upper surface is opened, and a filling resin is filled in the case (refer to Unexamined Japanese Patent Publication No. 2015-103777). Each capacitor element is manufactured such that two metalized films each configured by depositing metal such as aluminum on a surface of a film such as polypropylene are stacked and wound, and metal such as zinc is splayed on both end surfaces of the wound metalized films to form metallikon electrodes.

In such a capacitor unit, a fixing jig is conventionally used in a process in which the plurality of film capacitors and the bus bars are accommodated in the case, and the filling resin is filled in the case. The fixing jig fixes both the bus bars and the case to position the bus bars with respect to the case. This secures dimensional accuracy of the bus bars. However, the use of the jig in this manner needs to provide a jig according to a capacitor unit. This increases a production cost, and needs a process to mount and release the bus bars and the case to and from the jig, thereby increasing assembling man-hours for the capacitor unit.

To omit the jig, a method in which positioning structure using fitting or other techniques is provided between the bus bars and the case can be adopted.

SUMMARY

A first aspect of the present invention relates to a film capacitor having a first end surface and a second end surface that are parallel to each other including: a first electrode disposed at the first end surface; a second electrode disposed at the second end surface; a first metal layer connected to the first electrode; a first film connected to the first electrode and the second electrode, the first film including resin; a second metal layer connected to the second electrode; and a second film connected to the first electrode and the second electrode, the second film including resin. The film capacitor is configured by winding or laminating the first metal layer, the first film, the second metal layer, and the second film in a stacked state in this order. With the film capacitor according to the present aspect, an orientation angle α of the first film and an orientation angle β of the second film are different in sign from each other, when the orientation angle is defined by an acute angle between an orientation principle axis of the first film or the second film and a reference direction that is parallel to the first end surface and the second end surface in a film plane parallel to a main surface of the first film or the second film. Here, a sign of the orientation angle which represents rotation from the reference direction to one side is defined to be positive, and a sign of the orientation angle which represents rotation from the reference direction to the other side is defined to be negative, when portions of the first film and the second film which face each other via the second metal layer are viewed in an direction perpendicular to the film plane.

A second aspect of the present invention relates to a film capacitor having a first end surface and a second end surface that are parallel to each other including: a first electrode disposed at the first end surface; a second electrode disposed at the second end surface; a first metal layer connected to the first electrode; a first film connected to the first electrode and the second electrode, the first film including resin; a second metal layer connected to the second electrode; and a second film connected to the first electrode and the second electrode, the second film including resin. The film capacitor is configured by winding or laminating the first metal layer, the first film, the second metal layer, and the second film in a stacked state in this order. With the film capacitor according to the present aspect, a relationship between an orientation angle α of the first film and an orientation angle β of the second film satisfies $-20°<\alpha+\beta<+20°$, when the orientation angle is defined by an acute angle between an orientation principle axis of the first film or the second film and a reference direction that is parallel to the first end surface and the second end surface in a film plane parallel to a main surface of the first film or the second film. Here, a sign of the orientation angle which represents rotation from the reference direction to one side is defined to be positive, and a sign of the orientation angle which represents rotation from the reference direction to the other side is defined to be negative, when portions of the first film and the second film which face each other via the second metal layer are viewed in an direction perpendicular to the film plane.

A capacitor unit according to a third aspect of the present invention includes: the film capacitor according to the first or second aspect; a first bus bar and a second bus bar respectively connected to the first electrode and the second electrode of the film capacitor; a case that accommodates the film capacitor, the first bus bar, and the second bus bar; and a filling resin filled in the case, the filling resin having a thermosetting property.

A method for producing a film capacitor according to a fourth aspect of the present invention including: preparing a first divided film formed by dividing a raw film along a width direction into a plurality of films, the raw film being a biaxially-stretched film; preparing a second divided film by dividing the raw film or a separately-prepared film that is the biaxially-stretched film, the second divided film being taken out from a region different from a region for the first divided film in the width direction; forming a first metal layer and a second metal layer by depositing metal on one surface of the first divided film and on one surface of the second divided film, respectively; forming a first subdivided film and a second subdivided film by subdividing, with a predetermined width, the first divided film on the one surface of which the first metal layer is formed and the second divided film on the one surface of which the second metal layer is formed, respectively; winding or laminating the first subdivided film and the second subdivided film in a stacked state; and forming a pair of electrodes on both end surfaces of the first subdivided film and the second subdivided film that are wound or laminated.

A method for producing a film capacitor according to a fifth aspect of the present invention including: preparing a first divided film formed by dividing a raw film along a width direction into a plurality of films, the raw film being a biaxially-stretched film; preparing a second divided film by dividing the raw film or a separately-prepared raw film that is the biaxially-stretched film, the second divided film being taken out from a region identical to a region for the first divided film or a position near the position for the first divided film along the width direction; forming a first metal layer by depositing metal on one surface of the first divided film; forming a second metal layer by depositing metal on a surface that is one surface of the second divided film, and that is a surface of the raw film or the separately-prepared raw film that is the biaxially-stretched film and corresponds to a rear surface of the one surface of the first divided film; forming a first subdivided film and a second subdivided film by subdividing, with a predetermined width, the first divided film on the one surface of which the first metal layer is formed and the second divided film on the one surface of which the second metal layer is formed, respectively; winding or laminating the first subdivided film and the second subdivided film in a stacked state; and forming a pair of electrodes on both end surfaces of the first subdivided film and the second subdivided film that are wound or laminated.

A method for producing a film capacitor according to a sixth aspect of the present invention includes; preparing a divided film formed by dividing a raw film along a width direction into a plurality of films, the raw film being a biaxially-stretched film; forming a first metal layer having a predetermined width by depositing metal on a first surface of the divided film, the first metal layer extending along a longitudinal direction of the divided film, and forming a second metal layer having a predetermined width by depositing metal on a second surface of the divided film at a region not corresponding to the first metal layer, the second metal layer extending along the longitudinal direction of the divided film, the second surface being opposite to the first surface; forming a first subdivided film including the first metal layer and a second subdivided film including the second metal layer by subdividing the divided film whose first surface is formed with the first metal layer and whose second surface is formed with the second metal layer; winding or laminating the first subdivided film and the second subdivided film in a stacked state; and forming a pair of electrodes on both end surfaces of the first subdivided film and the second subdivided film that are wound or laminated.

The present invention can provide a film capacitor capable of suppressing an irregular deformation occurring when exposed to high temperature, a film capacitor unit including such a film capacitor, and a method for producing such a film capacitor.

Effects or meanings of the present invention will be further clarified in the following description of an exemplary embodiment. However, the exemplary embodiment described below is merely an example of implementing the present invention, and the present invention is not at all limited to the example described in the following exemplary embodiment.

BRIEF DESCRIPTION OF THE DRAWINGS

FIG. 9 is an exploded perspective view illustrating the capacitor unit according to the exemplary embodiment.

FIG. 11 is a view for describing a producing process of a film capacitor according to a first modification.

FIG. 13 is a view for describing producing processes of a film capacitor according to a second modification.

DESCRIPTION OF EMBODIMENT

Figure 1A:
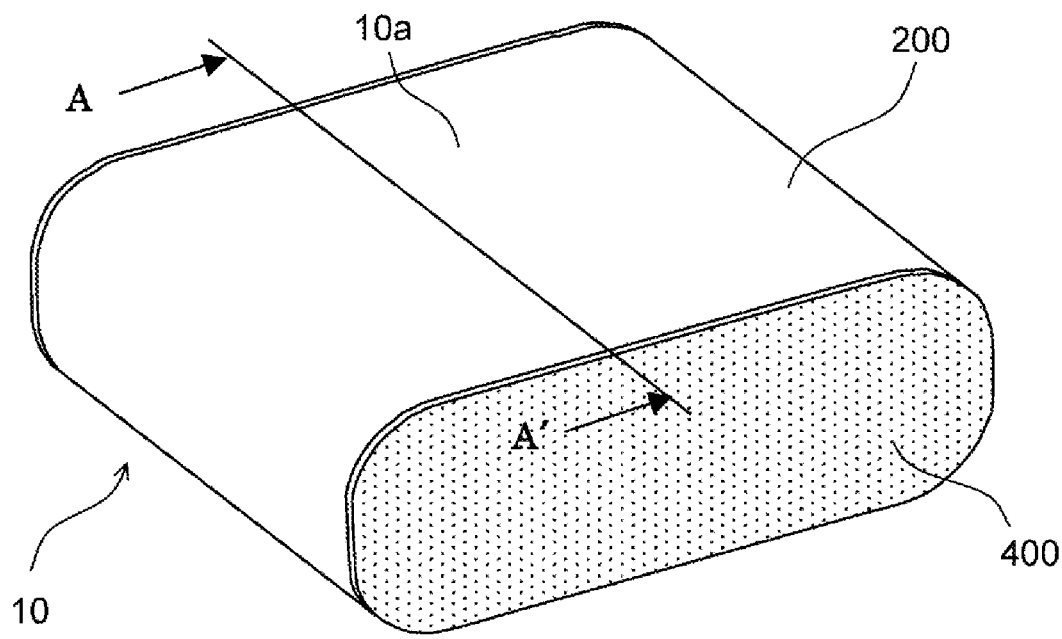
FIG. 1A is a perspective view illustrating a film capacitor according to an exemplary embodiment.

In the above-described capacitor unit, the inside of the case is heated to cure the filling resin in the case. At this time, the film capacitors accommodated in the case is exposed to high temperature. This causes thermal expansion of the film capacitors.

As described above, with the positioning structure provided between the bus bars and the case, the filling resin is cured into a shape according to shapes of the film capacitors that have been thermally expanded when the capacitor unit is not fixed by a fixing jig. This can cause a deformation of the capacitor unit after the filling resin is cured.

The inventors have examined the above-described production of the capacitor unit without the jig, and have found that a deformation state of the produced capacitor unit has variation. Through investigation of a cause of the variation by the inventors, it has been found that thermal behavior (how the thermal expansion progresses) when a film capacitor is exposed to high temperature causes variation due to a process in which the film capacitor is produced.

Some of the produced film capacitors may show an irregular deformation such that one end surface and the other end surface facing each other are twisted. This is because flat portions on both sides that are pressed into a flattened shape in an outer peripheral surface of the film capacitor non-uniformly expand in thermal expansion thereof. When a capacitor unit including such a film capacitor that causes the irregular deformation is used, the capacitor unit itself causes an irregular deformation while being twisted. As a result, connecting terminal parts to be connected to external terminals, which are located at distal end parts of the bus bars, largely displace from normal positions. Accordingly, this capacitor unit may be a defected product.

Two dielectric films constituting a film capacitor are formed from an identical divided film formed by dividing a raw film that is a biaxially-stretched film into a plurality of films along a width direction. A direction of an orientation main axis of the divided film varies according to a position in the raw film from which the divided film is taken out. In other words, in the raw film, the direction of the orientation main axis at a central position along the width direction is a direction substantially parallel to right end and left end of the raw film. When the orientation main axis is closer to one of the right end and the left end, the orientation main axis inclines more toward the corresponding end from the direction substantially parallel to the right end and the left end of the raw film. Accordingly, the divided film located at the center of the raw film has substantially 0° of an orientation angle, and the divided film located closer to the end surface has a larger absolute value of the orientation angle when the orientation angle is defined by an acute angle between the orientation main axis and a reference direction parallel to both end of the raw film. Here, when viewed from a direction perpendicular to a film surface, a sign of the orientation angle which represents rotation from the reference direction to one side is defined to be positive, and a sign of the orientation angle which represents rotation from the reference direction to the other side is defined to be negative.

Through deeper investigation of a cause of a deformation by the inventors, it has been found that flat portions on an outer peripheral surface are not uniformly expanded in a case where a film capacitor is configured with two dielectric films formed from an identical divided film located closer to the end of the raw film, which has the larger absolute value of the orientation angle, when the film capacitor is thermally expanded. Consequently, an irregular deformation occurs in the film capacitor such that one end surface and the other end surface facing each other are twisted.

Therefore, the present invention provides a film capacitor capable of suppressing an irregular deformation occurring when exposed to high temperature, a film capacitor unit including such a film capacitor, and a method for producing such a film capacitor.

An exemplary embodiment of the present invention will be described below with reference to the accompanying drawings. In the present exemplary embodiment, low-angled strip film 600L and high-angled strip film 600H respectively correspond to a "first divided film" and a "second divided film" described in the claims. Furthermore, subdivided low-angled strip films 800L and subdivided high-angled strip films 800H respectively correspond to a "first subdivided film" and a "second subdivided film" described in the claims.

However, the above description is only intended to define correspondences between constituents shown in the appended claims and constituents shown in the exemplary embodiment. The correspondences described above should not be construed to limit the scope of the present invention described in the appended claims to the configuration described in the exemplary embodiment.

<Structure of Film Capacitor>

First, film capacitor 10 according to the present exemplary embodiment will be described. Film capacitor 10 is produced by a method for producing film capacitor 10 according to the present exemplary embodiment, which will be described later.

Figure 1B:
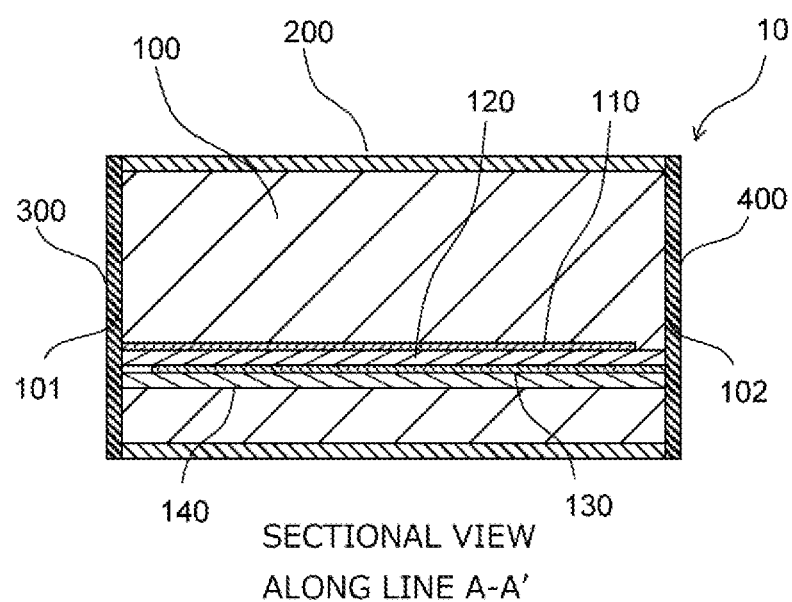
FIG. 1B is a longitudinal sectional view illustrating the film capacitor according to the exemplary embodiment, cut along line A-A' in FIG. 1A.
Figure 1C:
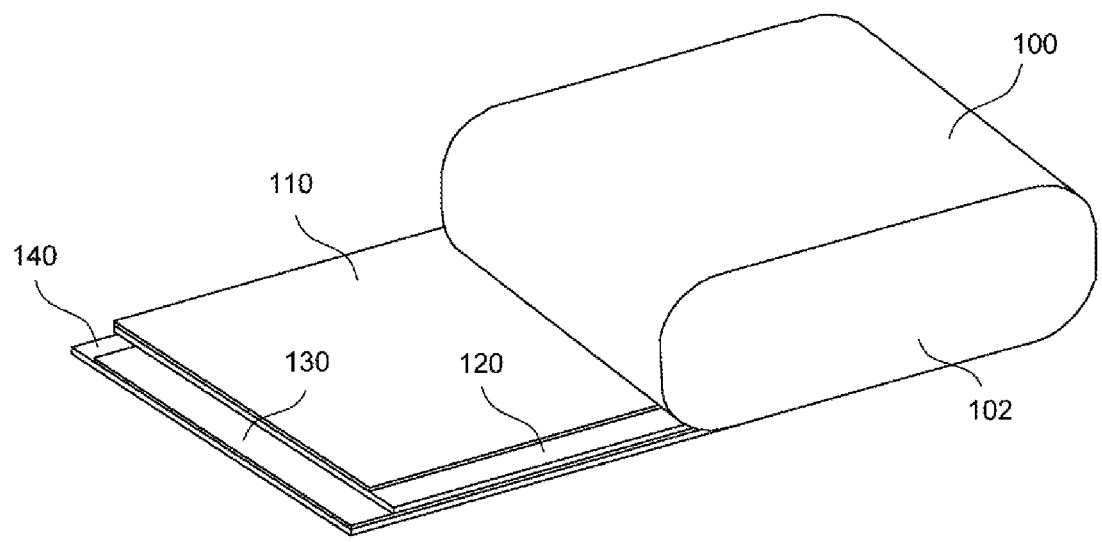
FIG. 1C is a perspective view illustrating a capacitor body according to the exemplary embodiment.

FIG. 1A is a perspective view illustrating film capacitor 10 according to the present exemplary embodiment. FIG. 1B is a longitudinal sectional view illustrating film capacitor 10 according to the present exemplary embodiment, cut along line A-A' in FIG. 1A. FIG. 1C is a perspective view illustrating capacitor body 100 according to the present exemplary embodiment. Note that, in FIG. 1B, first metal layer 110, first film 120, second metal layer 130, and second film 140 that constitute capacitor body 100 are partially illustrated, and illustration of remaining portions is omitted as indicated with hatched lines. For the sake of convenience, FIG. 1C illustrates a state in which first film 120 and second film 140 are partially peeled off, and ends of two films are not matched each other.

Film capacitor 10 includes capacitor body 100, exterior film 200, first electrode 300, and second electrode 400. Film capacitor 10 is formed into a flattened columnar shape whose sectional view has a long circle outline, and includes flat parts 10a on both upper and lower sides of an outer peripheral surface of the flattened columnar shape.

Capacitor body 100 is formed by winding or laminating first metal layer 110, first film 120, second metal layer 130, and second film 140 that are in a stacked state in this order. First film 120 and second film 140 are dielectric films formed from a resin material such as polypropylene (PP), polyethylene terephthalate (PET), and polyethylene naphthalate (PEN). First metal layer 110 and second metal layer 130 are respectively formed by depositing metal such as aluminum, zinc, and magnesium, or an alloy of such metal on surfaces of first film 120 and second film 140, and serve as internal electrodes.

Exterior film 200 is wound a plurality of times (a plurality of turns) around a peripheral surface of capacitor body 100. The peripheral surface of capacitor body 100 is thus covered with exterior film 200 in a multilayered form. Exterior film 200 protects capacitor body 100 to be prevented, for example, from being damaged or broken. Examples of a material for exterior film 200 include PP, PET, and PEN that are the same as the material for first film 120 and second film 140.

First electrode 300 and second electrode 400 are respectively formed by spraying metal such as aluminum, zinc, and magnesium on first end surface 101 and second end surface 102 of capacitor body 100. First end surface 101 and second end surface 102 respectively serve as a first end surface and a second end surface of film capacitor 10. First electrode 300 and second electrode 400 are each connected with a lead-out terminal such as a bus bar to draw out electricity from film capacitor 10.

First metal layer 110 is connected to first electrode 300, and is distant from second electrode 400 by a predetermined insulation distance. Second metal layer 130 is connected to second electrode 400, and is distant from first electrode 300 by a predetermined insulation distance. First film 120 and second film 140 are both connected to first electrode 300 and second electrode 400.

Figure 2A:
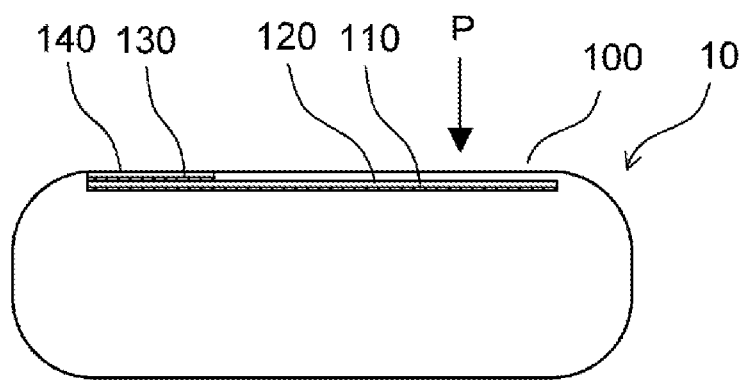
FIG. 2A is a view illustrating the film capacitor according to the exemplary embodiment when viewed from an end surface.
Figure 2B:
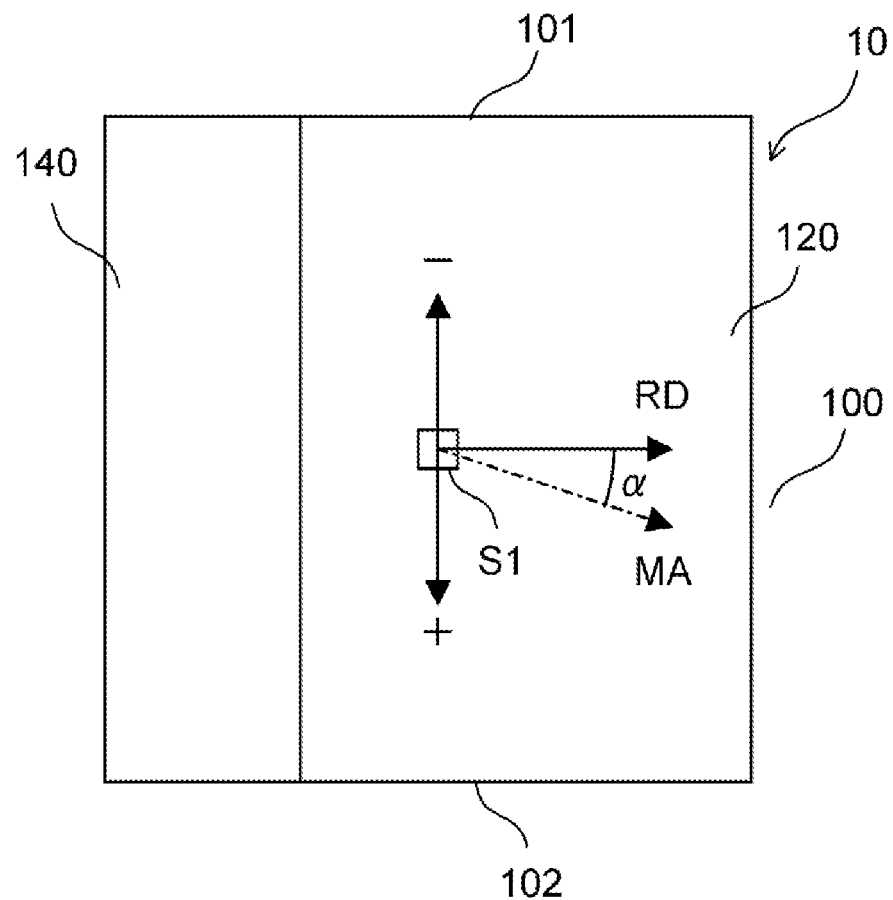
FIG. 2B is a view illustrating the film capacitor according to the exemplary embodiment when viewed along direction P in FIG. 2A.
Figure 2C:
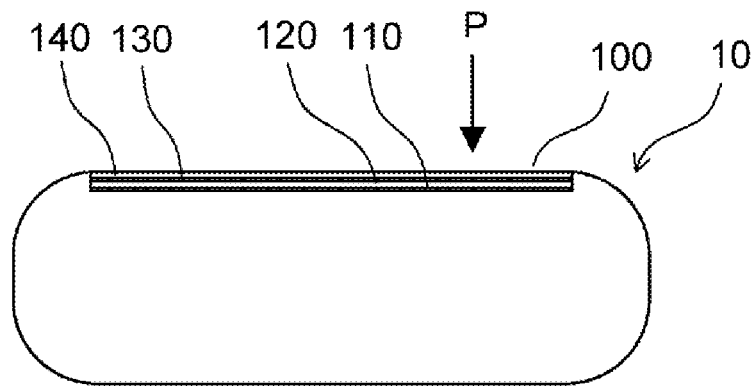
FIG. 2C is a view illustrating the film capacitor according to the exemplary embodiment when viewed from the end surface.
Figure 2D:
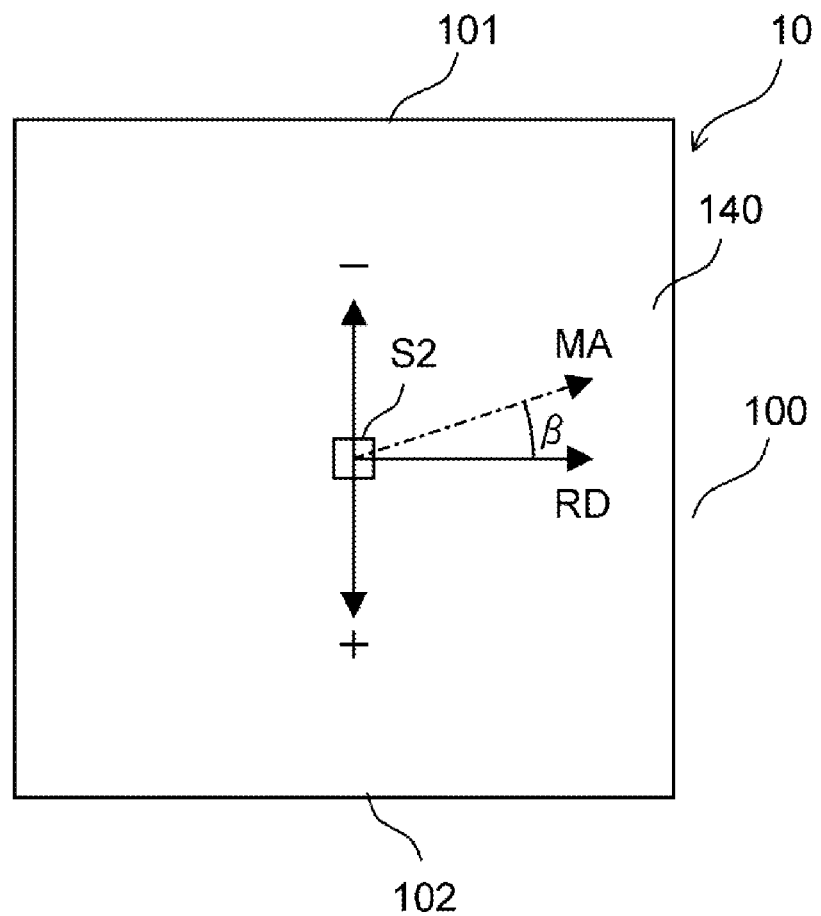
FIG. 2D is a view illustrating the film capacitor according to the exemplary embodiment when viewed along direction P in FIG. 2C.

FIG. 2A is a view illustrating film capacitor 10 according to the present exemplary embodiment when viewed from an end surface. FIG. 2B is a view illustrating film capacitor 10 according to the present exemplary embodiment when viewed along direction P in FIG. 2A. FIG. 2C is a view illustrating film capacitor 10 according to the present exemplary embodiment when viewed from the end surface. FIG. 2D is a view illustrating film capacitor 10 according to the present exemplary embodiment when viewed along direction P in FIG. 2C. Note that, for the sake of convenience, in FIGS. 2A, 2B, 2C, and 2D, illustration of exterior film 200, first electrode 300, and second electrode 400 is omitted. For the sake of convenience, in FIGS. 2A and 2C, first metal layer 110, first film 120, second metal layer 130, and second film 140 are partially illustrated, and in FIGS. 2A and 2B, second metal layer 130 and second film 140 overlapping with first film 120 are partially cut out.

In film surfaces of first film 120 and second film 140, an acute angle between orientation main axis MA and reference direction RD that is parallel to first end surface 101 and second end surface 102 is defined as an orientation angle. Furthermore, a sign of an orientation angle which represents rotation from reference direction RD to second end surface 102 is defined to be positive, and a sign of an orientation angle which represents rotation from reference direction RD to first end surface 101 is defined to be negative, when portions of first film 120 and second film 140 facing each other via second metal layer 130 are viewed along a direction perpendicular to the film surfaces, that is, direction P in FIGS. 2A and 2C. At this time, an orientation angle α of first film 120 and an orientation angle β of second film 140 are different in sign from each other. For example, a sign of the orientation angle α of first film 120 is positive, and a sign of the orientation angle β of second film 140 is negative. Note that a relationship between the orientation angle α of first film 120 and the orientation angle β of second film 140 desirably satisfies $-20°<\alpha+\beta 20°$, as well as $\alpha-\beta<-5°$ or $+5°<\alpha-\beta$. Furthermore, it is most desirable that the relationship satisfy $|\alpha|=|\beta|$ or $|\alpha|\approx|\beta|$.

For example, when the orientation angle α of first film 120 is set to be +15°, the orientation angle β of second film 140 is set to be $-35°<\beta<0°$, and is most preferably set to be $-15°$. When the orientation angle α of first film 120 is set to be +10°, the orientation angle β of second film 140 is set to be $-30°<\beta<0°$, and is most preferably set to be $-10°$. When the orientation angle α of first film 120 is set to be $-10°$, the orientation angle β of second film 140 is set to be $+30°>\beta>0°$, and is most preferably set to be +10°. When the orientation angle α of first film 120 is set to be $-15°$, the orientation angle β of second film 140 is set to be $+35°>\beta>0°$, and is most preferably set to be +15°.

The orientation angle α of first film 120 can be obtained by cutting out, as sampling region S1, a predetermined position of first film 120 along a width direction, for example, a region of a central position of first film 120, and measuring an orientation angle of sampling region S1 by using a known measurement method such as a Fourier transform type infrared spectroscopy. Similarly, the orientation angle β of second film 140 can be obtained by cutting out, as sampling region S2, a region of second film 140 facing sampling region S1, and measuring an orientation angle of sampling region S2.

<Method for Producing Film Capacitor>

Next, a method for producing film capacitor 10 will be described.

Figure 3:
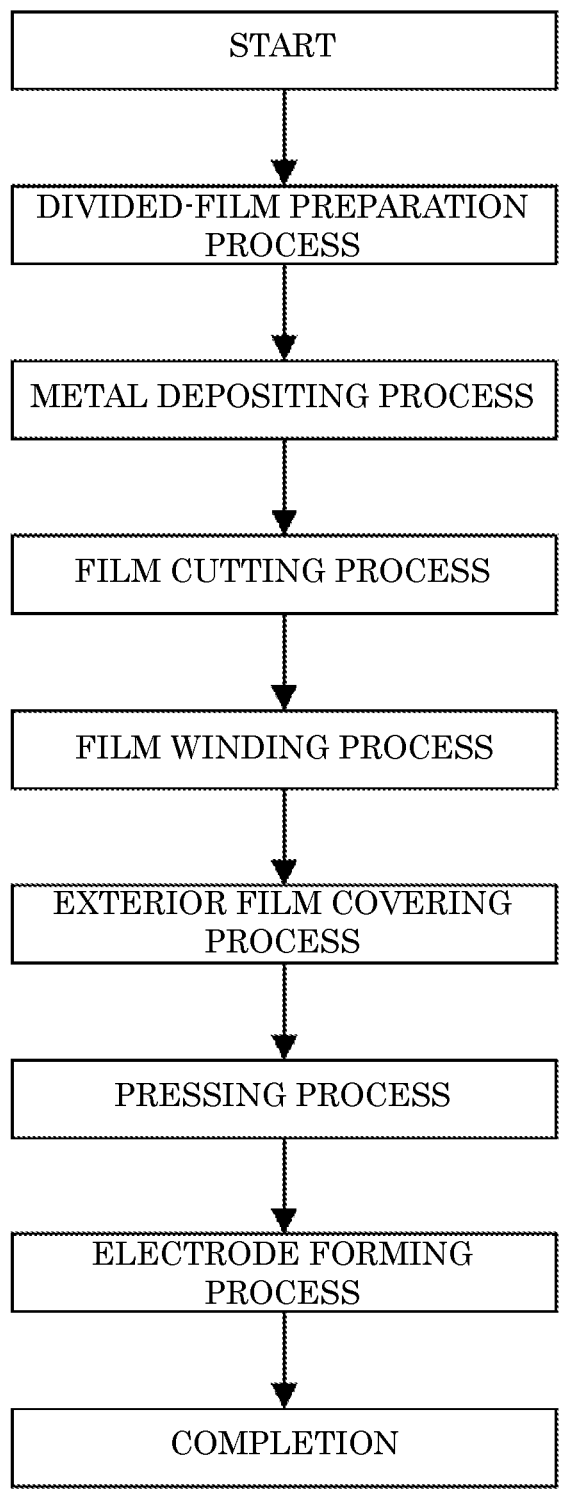
FIG. 3 is a flow chart illustrating producing processes of the film capacitor according to the exemplary embodiment.
Figure 4:
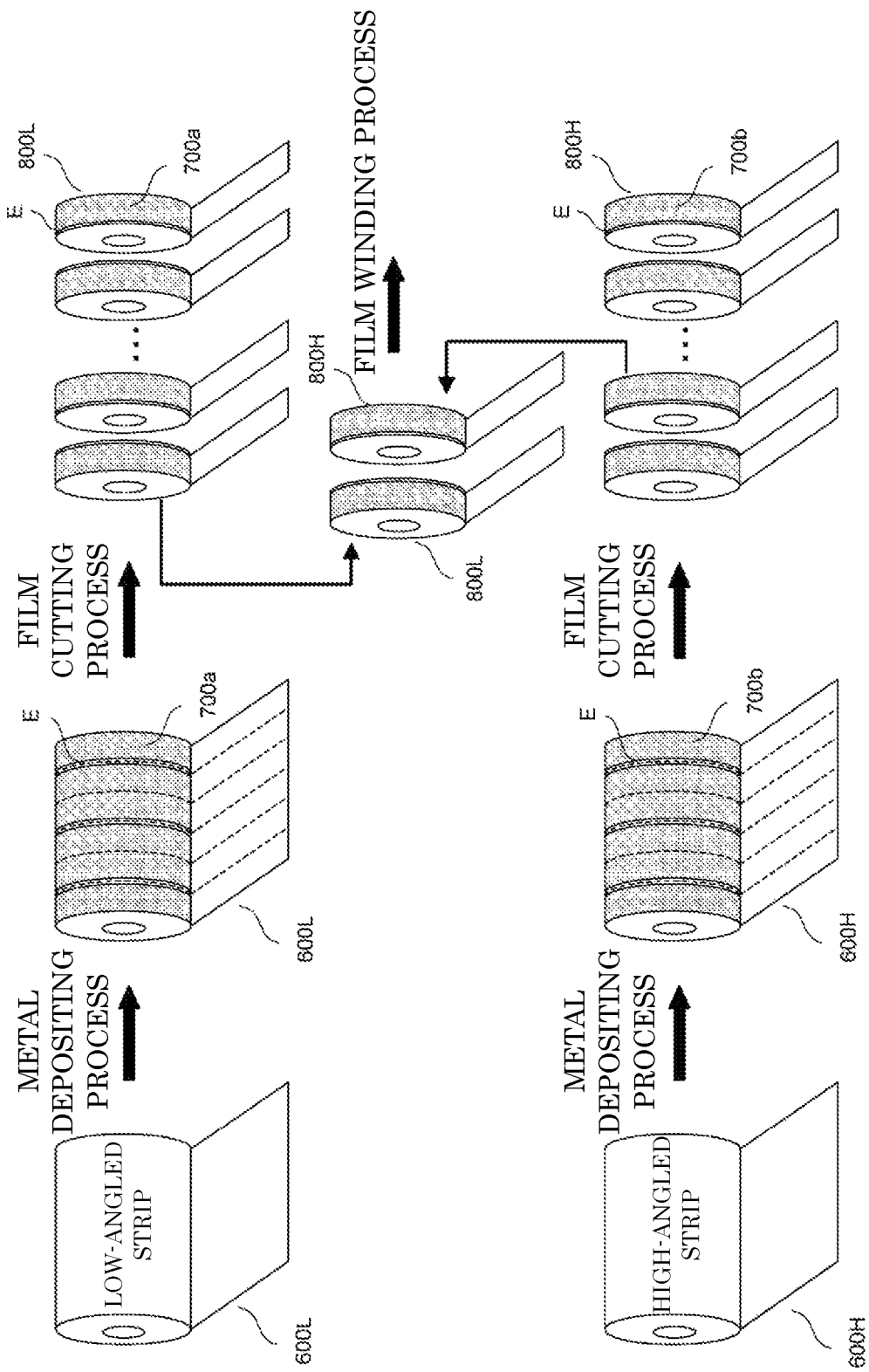
FIG. 4 is a view for describing a flow of the producing processes of the film capacitor according to the exemplary embodiment.
Figure 5:
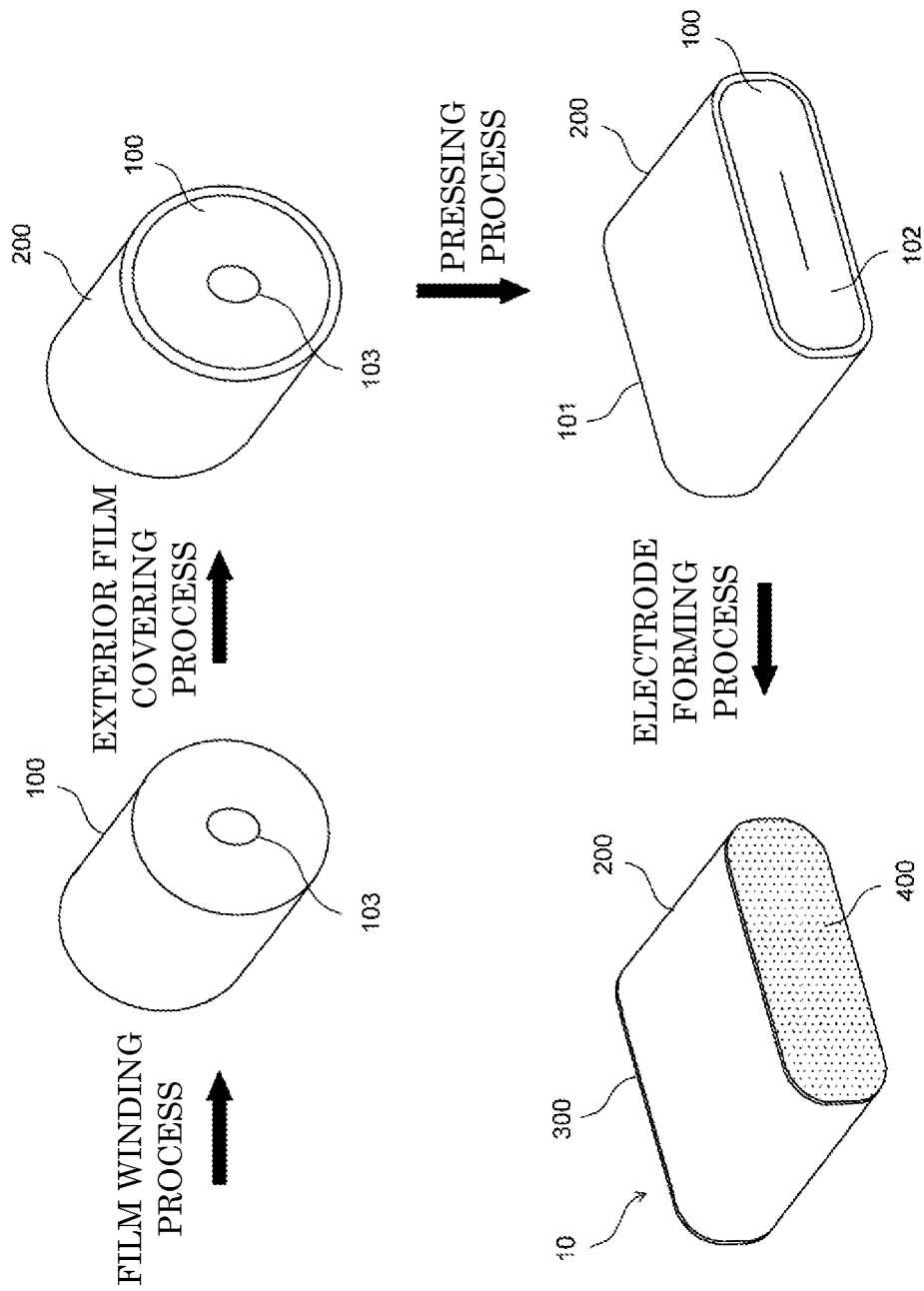
FIG. 5 is a view for describing the flow of the producing processes of the film capacitor according to the exemplary embodiment.
Figure 6:
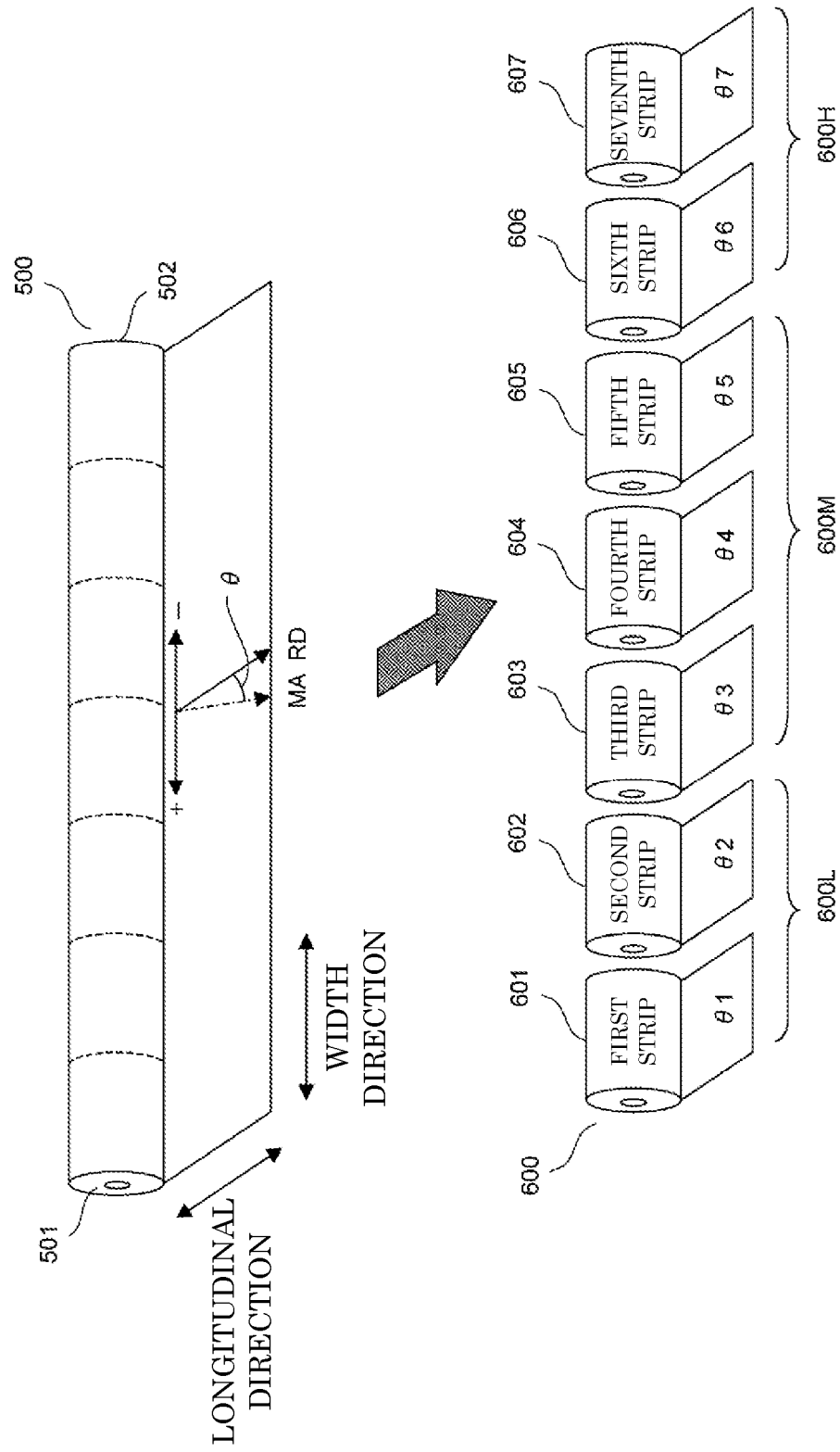
FIG. 6 is a view for describing a divided film prepared in a divided-film preparation process according to the exemplary embodiment.
Figure 7A:
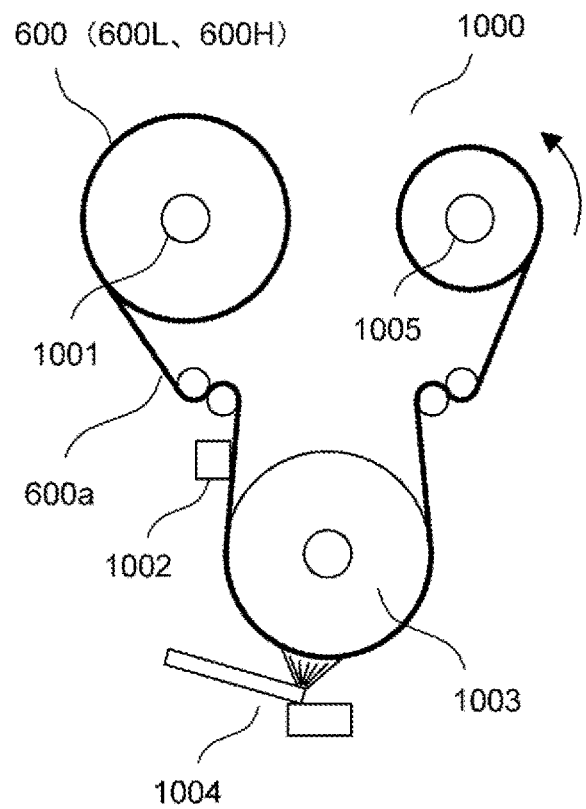
FIG. 7A is a view for describing a metal depositing process according to the exemplary embodiment.
Figure 7B:
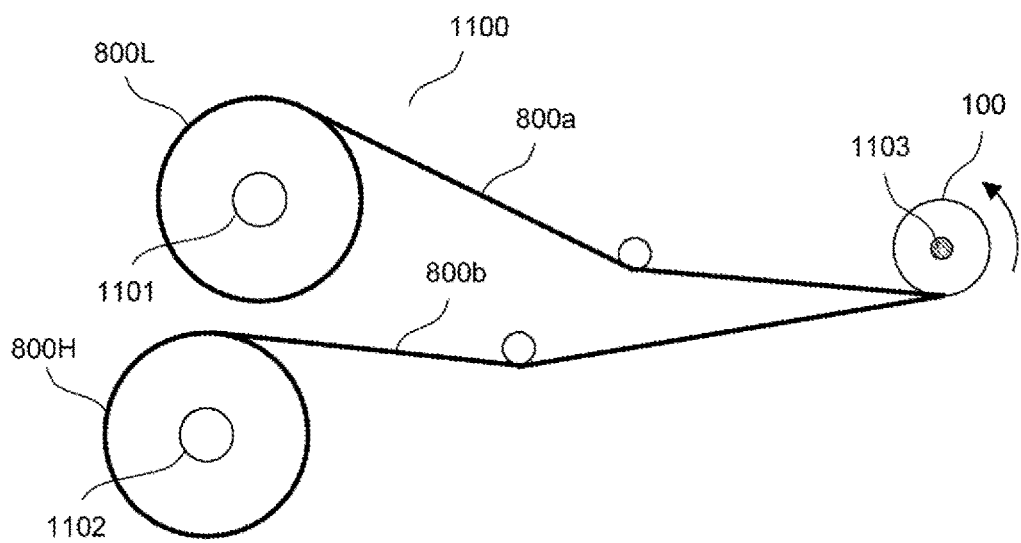
FIG. 7B is a view for describing a film winding process according to the exemplary embodiment.

FIG. 3 is a flow chart illustrating producing processes of film capacitor 10 according to the present exemplary embodiment. FIGS. 4 and 5 are views for describing a flow of the producing processes of film capacitor 10 according to the present exemplary embodiment. FIG. 6 is a view for describing divided film 600 prepared in a divided-film preparation process according to the present exemplary embodiment. FIG. 7A is a view for describing a metal depositing process according to the present exemplary embodiment. FIG. 7B is a view for describing a film winding process according to the present exemplary embodiment.

As illustrated in FIG. 3, the producing processes of film capacitor 10 according to the present exemplary embodiment include the divided-film preparation process, the metal depositing process, a film cutting process, the film winding process, an exterior film covering process, a pressing process, and an electrode forming process.

<Divided-Film Preparation Process>

First, the divided-film preparation process is performed. In the divided-film preparation process, two divided films 600 each having a rolled shape, from which first film 120 and second film 140 are cut out, are prepared.

As illustrated in FIG. 6, divided films 600 are formed by dividing rolled raw film 500 that is a biaxially-stretched film into a plurality of pieces, for example, seven pieces, along a width direction. Hereinafter, divided films 600 are referred to as first strip film 601, second strip film 602, third strip film 603, fourth strip film 604, fifth strip film 605, sixth strip film 606, and seventh strip film 607, in this order from the left end in FIG. 6. Furthermore, seven divided films 600 are classified into three groups. First strip film 601 and second strip film 602 are referred to as low-angled strip films 600L. Third strip film 603, fourth strip film 604, and fifth strip film 605 are referred to as middle-angled strip films 600M. Sixth strip film 606 and seventh strip film 607 are referred to as high-angled strip films 600H.

A direction of orientation main axis MA of one of divided films 600 varies according to a position in raw film 500 from which the one of divided films 600 is taken out. In other words, raw film 500 has a direction of orientation main axis MA that is substantially parallel to left end surface 501 and right end surface 502 of raw film 500 at a central position along the width direction, and gradually inclines toward left end surface 501 or right end surface 502 from the direction substantially parallel to left end surface 501 and right end surface 502 when being closer to the corresponding end surface. Accordingly, when an acute angle between orientation main axis MA and reference direction RD parallel to both end surfaces 501, 502 of raw film 500 is defined as an orientation angle θ, a sign of the orientation angle θ which represents rotation from reference direction RD to left end surface 501 when viewed from a direction perpendicular to a film surface is defined to be positive, and a sign of the orientation angle θ which represents rotation from reference direction RD to right end surface 502 when viewed from the same direction is defined to be negative, an orientation angle θ4 of fourth strip film 604 located at the center of raw film 500 is substantially 0°. Meanwhile, in remaining divided films 600, an absolute value of the orientation angle θ becomes greater with one of divided films 600 closer to end surface 501 or end surface 502 of raw film 500. In other words, first strip film 601, second strip film 602, and third strip film 603 respectively have orientation angles θ1, θ2, and θ3 having positive signs, and satisfy $|θ1|>|θ2|>|θ3|$. Further, fifth strip film 605, sixth strip film 606, and seventh strip film 607 respectively have orientation angles θ5, θ6, and θ7 having negative signs, and satisfy $|θ5|<|θ6|<|θ7|$. Those orientation angles further satisfy $|θ1|=$or $\approx|θ7|$, $|θ2|=$or $\approx|θ6|$, and $|θ3|=$or $\approx|θ5|$.

For example, the orientation angles θ1, θ2, and θ3 are respectively equal to +15°, +10°, and +5°, and the orientation angles θ5, θ6, and θ7 are respectively equal to −5°, −10°, and −15°.

As illustrated in FIG. 4, the divided-film preparation process prepares low-angled strip film 600L and high-angled strip film 600H that are divided films 600 taken out from the different positions in raw film 500. Note that, low-angled strip film 600L and high-angled strip film 600H may be taken out from identical raw film 500, or may be taken out from different raw films 500.

<Metal Depositing Process>

The metal depositing process is then performed by using deposition device 1000. As illustrated in FIG. 7A, in the metal depositing process, film 600a is fed from divided film 600 (low-angled strip film 600L or high-angled strip film 600H) set around unwinding shaft 1001, and passes through margin oil spray 1002 provided for forming margin region E. Then, metal to serve as an internal electrode is deposited, by deposition device 1004, on an outer surface of film 600a thus fed in cooling drum 1003. Film 600a is then wound by winding shaft 1005 that rotates.

In such a metal depositing process, as illustrated in FIG. 4, first metal layer 700a and second metal layer 700b are formed on outer surfaces of low-angled strip film 600L and high-angled strip film 600H, respectively. Note that, on the outer surfaces of low-angled strip film 600L and high-angled strip film 600H, a plurality of margin regions E each of which has a certain width and on which first metal layer 700a or second metal layer 700b is not formed by a predetermined intervals are provided.

<Film Cutting Process>

The film cutting process is then performed. In the film cutting process, low-angled strip film 600L and high-angled strip film 600H on which first metal layer 700a and second metal layer 700b are respectively formed are cut to be subdivided so as to have a width of film capacitor 10. At this time, low-angled strip film 600L and high-angled strip film 600H are cut at a central position of margin region E and an intermediate position of two adjacent margin regions E. In such a film cutting process, as illustrated in FIG. 4, a plurality of subdivided low-angled strip films 800L and a plurality of subdivided high-angled strip films 800H are formed.

Subsequently, as illustrated in FIG. 4, from among the plurality of subdivided low-angled strip films 800L and the plurality of subdivided high-angled strip films 800H, one subdivided low-angled strip film 800L and one subdivided high-angled strip film 800H each of which has margin region E at a different position from each other are taken out. Those subdivided low-angled strip film 800L and subdivided high-angled strip film 800H are subjected to the film winding process.

<Film Winding Process>

Winding device 1100 is used in the film winding process. As illustrated in FIG. 7B, film 800a is fed from subdivided low-angled strip film 800L set around first unwinding shaft 1101, and film 800b is fed from subdivided high-angled strip film 800H set around second unwinding shaft 1102. Two films 800a, 800b thus fed are stacked and then wound by winding shaft 1103 that rotates to form capacitor body 100 around winding shaft 1103. At this time, subdivided low-angled strip films 800L (film 800a) and subdivided high-angled strip films 800H (film 800b) are wound by winding device 1100 so that first metal layer 700a and second metal layer 700b, which are respectively formed on subdivided low-angled strip film 800L and subdivided high-angled strip film 800H, are positioned on an inner side of capacitor body 100. Further, in this process, subdivided high-angled strip film 800H is stacked on an outer side of subdivided low-angled strip films 800L.

As illustrated in FIG. 5, capacitor body 100 formed in the film winding process has a substantially columnar shape, and formed with shaft hole 103 from which winding shaft 1103 is pulled out, in its center.

<Exterior Film Covering Process>

The exterior film covering process is then performed. In the exterior film covering process, exterior film 200 is wound a plurality of times on a peripheral surface of capacitor body 100, and layers of exterior film 200 are thermally welded. As illustrated in FIG. 5, the peripheral surface of capacitor body 100 is covered with exterior film 200 in a multilayered form.

<Pressing Process>

The pressing process is then performed. In the pressing process, capacitor body 100 covered with exterior film 200 is vertically pressed by using a pressing device or a pressing jig (not illustrated), and is deformed into a flattened shape as illustrated in FIG. 5. At this time, shaft hole 103 of capacitor body 100 is lost.

<Electrode Forming Process>

The electrode forming process is then performed. In the electrode forming process, metal is splayed to both end surfaces 101, 102 of flattened capacitor body 100 from a splay device (not illustrated) to form first electrode 300 and second electrode 400.

All producing processes are thus finished, and film capacitor 10 as illustrated in FIG. 1A and FIG. 5 is completed.

Through such producing processes (production method), film capacitor 10 in which the orientation angle α of first film 120 and the orientation angle β of second film 140 are different from each other so as to be positive and negative, or vice versa, is produced.

Note that, in the divided-film preparation process, it is desirable that, when first strip film 601 is prepared as low-angled strip film 600L, seventh strip film 607 be prepared as high-angled strip film 600H, and when second strip film 602 is prepared as low-angled strip film 600L, sixth strip film 606 be prepared as high-angled strip film 600H.

In the production method according to the present exemplary embodiment, middle-angled strip films 600M are not used. When middle-angled strip films 600M are used, a conventional production method is used, and first film 120 and second film 140 are formed from identical divided film 600. Note that, among from middle-angled strip films 600M, third strip film 603 and fifth strip film 605 may be used for the production method according to the present exemplary embodiment.

Film capacitor 10 according to the present exemplary embodiment is used for capacitor unit 1 mounted on various vehicles or various devices, for example.

Figure 8:
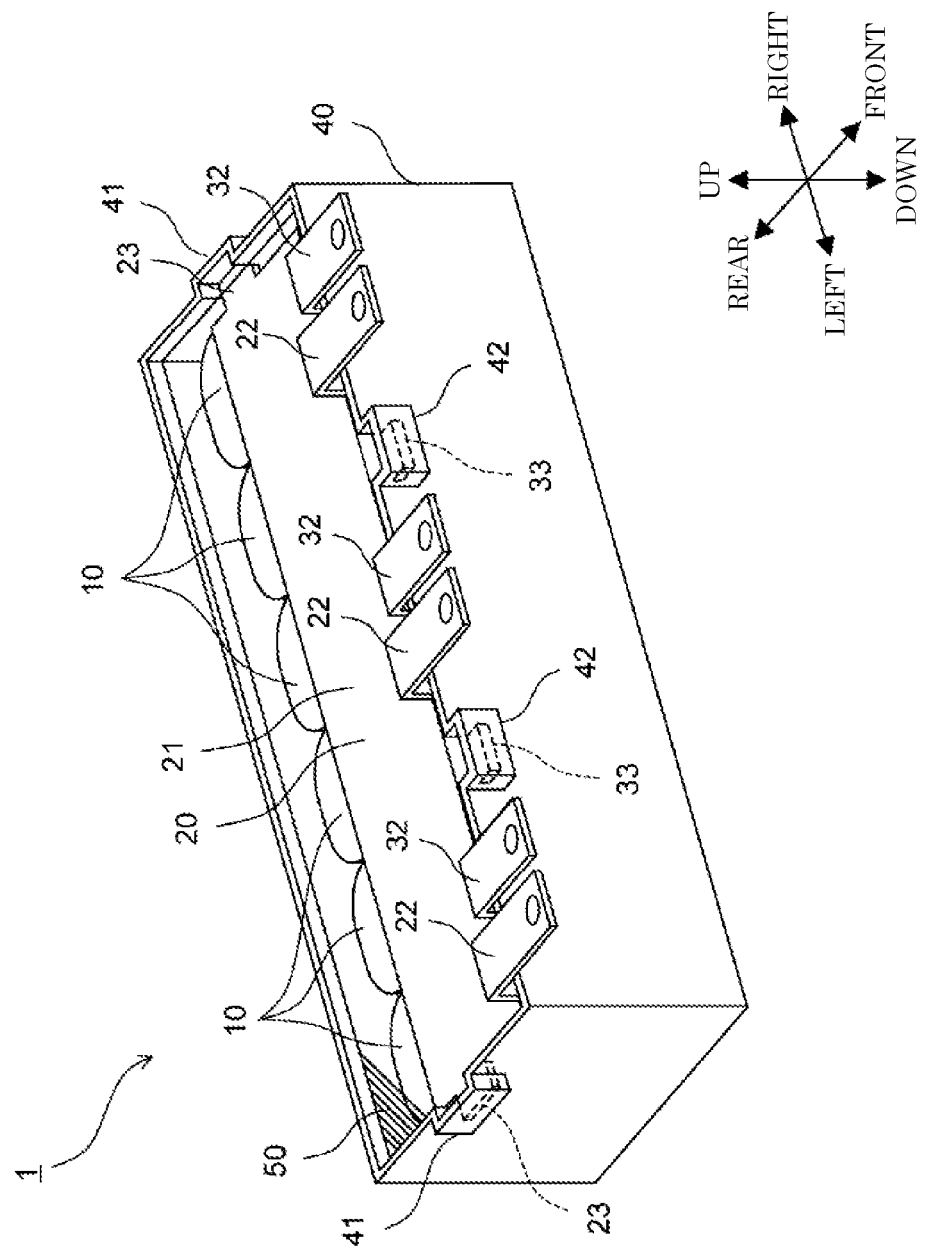
FIG. 8 is a perspective view illustrating a capacitor unit according to the exemplary embodiment.

FIG. 8 is a perspective view illustrating capacitor unit 1 according to the present exemplary embodiment. FIG. 9 is an exploded perspective view illustrating capacitor unit 1 according to the present exemplary embodiment. In FIG. 8, a part of filling resin 50 is hatched, and the remaining part is transparent, for the sake of convenience. Further, for the sake of convenience, directions including front and rear, right and left, and up and down are added to FIGS. 8 and 9. These directions are not absolute directions but relative directions in relation to an orientation of capacitor unit 1.

Capacitor unit 1 includes a plurality of film capacitors 10, first bus bar 20 and second bus bar 30 connected to those film capacitors 10, case 40 that accommodates film capacitors 10, first bus bar 20, and second bus bar 30, and filling resin 50 that is filled inside case 40.

The plurality of film capacitors 10 (for example, six pieces) are aligned such that first electrodes 300 and second electrodes 400 respectively face upward and downward along a right-left direction.

First bus bar 20 is formed from a conductive material, for example, a copper plate. For example, first bus bar 20 is formed by appropriately cutting off and bending a single copper plate, and includes first electrode terminal part 21 and three first connecting terminal parts 22. First electrode terminal part 21 is electrically connected to first electrode 300 of each film capacitor 10 by a connection method such as welding or soldering. First connecting terminal parts 22 are drawn ahead of case 40, and are electrically connected to external terminals (not illustrated) by a connection method such as screwing. In first bus bar 20, first positioning protrusions 23 that protrude rightward and leftward are respectively formed at right and left ends of first bus bar 20.

Second bus bar 30 is formed from a conductive material, for example, a copper plate. For example, second bus bar 30 is formed by appropriately cutting off and bending a single copper plate, and includes second electrode terminal part 31 and three second connecting terminal parts 32. Second electrode terminal part 31 is electrically connected to second electrode 400 of each film capacitor 10 by a connection method such as welding or soldering. Second connecting terminal parts 32 are drawn ahead of case 40, and are electrically connected to external terminals (not illustrated) by a connection method such as screwing. In second bus bar 30, second positioning protrusions 33 that protrude forward are respectively formed at right and left parts of a front end part of second bus bar 30.

Case 40 is formed in a rectangular parallelepiped box shape that is long in the right-left direction and whose upper surface is opened by a resin material such as a polyphenylene sulfide (PPS) resin. In case 40, first fitting recesses 41 are formed at respective positions corresponding to two first positioning protrusions 23 at right and left end parts. Second fitting recesses 42 are formed at respective positions corresponding to two second positioning protrusions 33 at the front end part.

By fitting first positioning protrusions 23 into first fitting recess 41, and fitting second positioning protrusions 33 into second fitting recesses 42, first bus bar 20 and second bus bar 30 are positioned with respect to case 40 in longitudinal and lateral directions.

Filling resin 50 is a thermosetting resin such as an epoxy resin or a urethane resin, and is cured when heated after being injected into case 40. Filling resin 50 covers primary parts of an assembly body including film capacitor 10, first bus bar 20, and second bus bar 30, and protects those parts against humidity or impact.

<Effects of Exemplary Embodiment>

The present exemplary embodiment exerts the following effects.

Figure 10A:
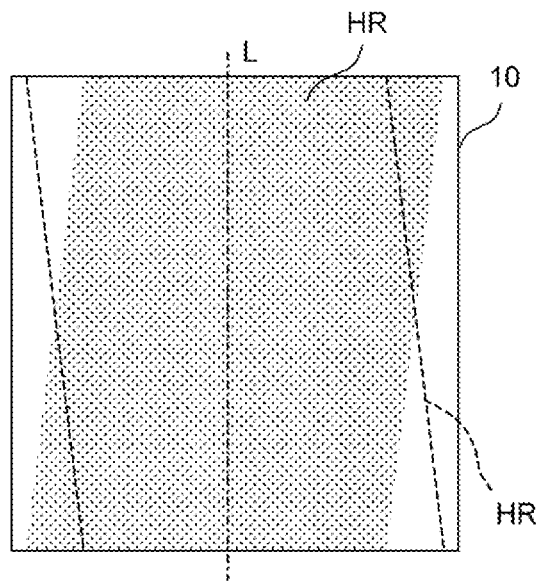
FIGS. 10A to 10D are views for describing an effect of the present exemplary embodiment.
Figure 10B:
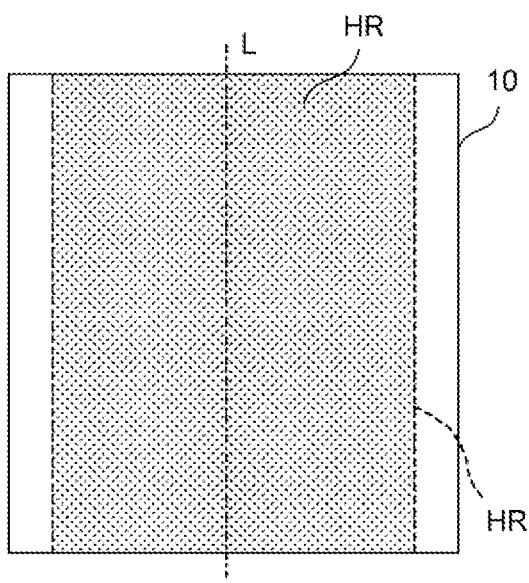
Figure 10C:
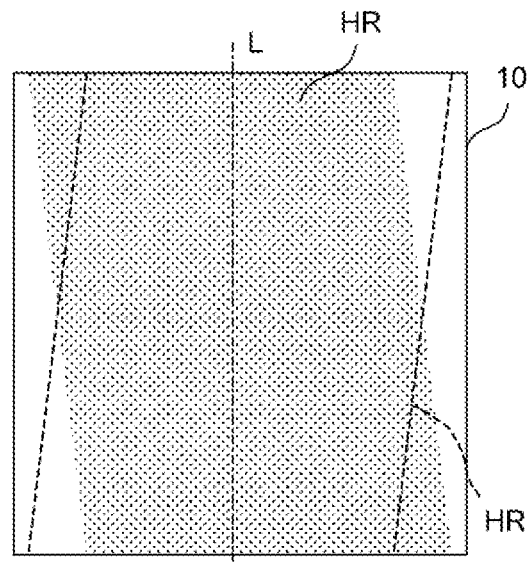
Figure 10D:
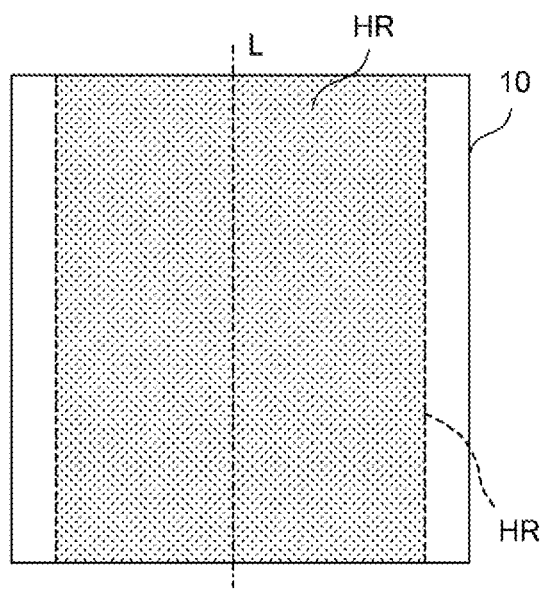

FIGS. 10A to 10D are views for describing effects of the present exemplary embodiment and schematically illustrating thermal behavior of film capacitor 10, which is confirmed by the present inventors through a test in which film capacitor 10 is heated to high temperature. FIG. 10A illustrates thermal behavior of a comparative example of film capacitor 10 configured with first film 120 and second film 140 that are both formed with first strip film 601. FIG. 10B illustrates thermal behavior of a comparative example of film capacitor 10 configured with first film 120 and second film 140 that are both formed with fourth strip film 604. FIG. 10C illustrates thermal behavior of a comparative example of film capacitor 10 configured with first film 120 and second film 140 that are both formed with seventh strip film 607. FIG. 10D illustrates thermal behavior of film capacitor 10 configured with first film 120 formed with first strip film 601 and second film 140 formed with seventh strip film 607, that is, film capacitor 10 according to the present exemplary embodiment.

FIGS. 10A to 10D are views when both end surfaces of film capacitor 10 are vertically aligned and that are viewed from flat part 10a of film capacitor 10, and a region whose thermal expansion coefficient is high (hereinafter, referred to as "high expansion region HR") is indicated in a gray color.

For film capacitor 10 in FIG. 10B formed with fourth strip film 604 whose orientation angle θ is substantially 0°, high expansion region HR is substantially parallel to axis direction L. Hence, at high temperature, flat part 10a expands substantially uniformly, and film capacitor 10 hardly experiences an irregular deformation.

In contrast, for film capacitor 10 in FIG. 10A and film capacitor 10 in FIG. 10C respectively formed with first strip film 601 and seventh strip film 607 whose absolute values of the orientation angles θ are large, due to an influence of inclination of orientation main axes MA with respect to reference direction RD, high expansion region HR is not parallel to axis direction L but inclined with respect to axis direction L. As illustrated with broken lines in FIGS. 10A and 10C, also in flat part 10a on an opposite side, high expansion region HR is similarly inclined with respect to axis direction L. This configuration hinders uniform expansion of flat part 10a at high temperature, and film capacitor 10 experiences an irregular deformation such that one end surface and the other end surface facing each other are twisted. Note that high expansion regions HR of film capacitor 10 in FIG. 10A and film capacitor 10 in FIG. 10C are inclined substantially symmetrically with respect to axis direction L.

Similar to film capacitor 10 in FIG. 10B, for film capacitor 10 in FIG. 10D that is film capacitor 10 according to the present exemplary embodiment, high expansion region HR is substantially parallel to axis direction L. It is estimated that, since the orientation angles have the positive and the negative signs different from each other (directions of orientation main axes MA are contrary to each other), an expansion characteristic of first film 120 in which high expansion region HR inclines toward one direction with respect to axis direction L and an expansion characteristic of second film 140 in which high expansion region HR inclines toward the other direction with respect to axis direction L are canceled each other. Hence, in film capacitor 10 according to the present exemplary embodiment, at high temperature, flat part 10a expands substantially uniformly, and film capacitor 10 hardly experiences an irregular deformation.

Note that FIG. 10D exemplifies film capacitor 10 formed from first strip film 601 and seventh strip film 607 whose absolute values of the orientation angles are substantially equal. However it can be considered that the cancellation effect is similarly exerted even with film capacitor 10 formed from first strip film 601 and sixth strip film 606 or second strip film 602 and seventh strip film 607 whose absolute values of the orientation angles are slightly different from each other. Therefore, reduction in inclination of high expansion region HR with respect to axis direction L as well as suppression of the irregular deformation of film capacitor 10 can be expected.

As described above, according to film capacitor 10 of the present exemplary embodiment and the method for producing film capacitor 10, the signs of the orientation angle α of first film 120 and the orientation angle β of second film 140 are made different from each other so as to be positive and negative, or vice versa, so that the irregular deformation of film capacitor 10 when exposed to high temperature can be prevented.

Furthermore, according to capacitor unit 1 of the present exemplary embodiment, even when the inside of case 40 is heated to cure filling resin 50 in case 40 and film capacitor 10 in case 40 is exposed to high temperature, the irregular deformation of film capacitor 10 can be suppressed. As described above, with the positioning structure provided between first bus bar 20 and case 40 as well as between second bus bar 30 and case 40, even when capacitor unit 1 is configured not to be fixed by a fixing jig upon injecting filling resin 50, the irregular deformation of capacitor unit 1 after filling resin 50 is cured can be prevented.

Although the exemplary embodiment of the present invention has been described above, the present invention is not limited to the exemplary embodiment described above, and moreover, various modifications can be applied to application examples according to the present invention besides the exemplary embodiment described above.

<First Modification of Method for Producing Film Capacitor>

Figure 12:
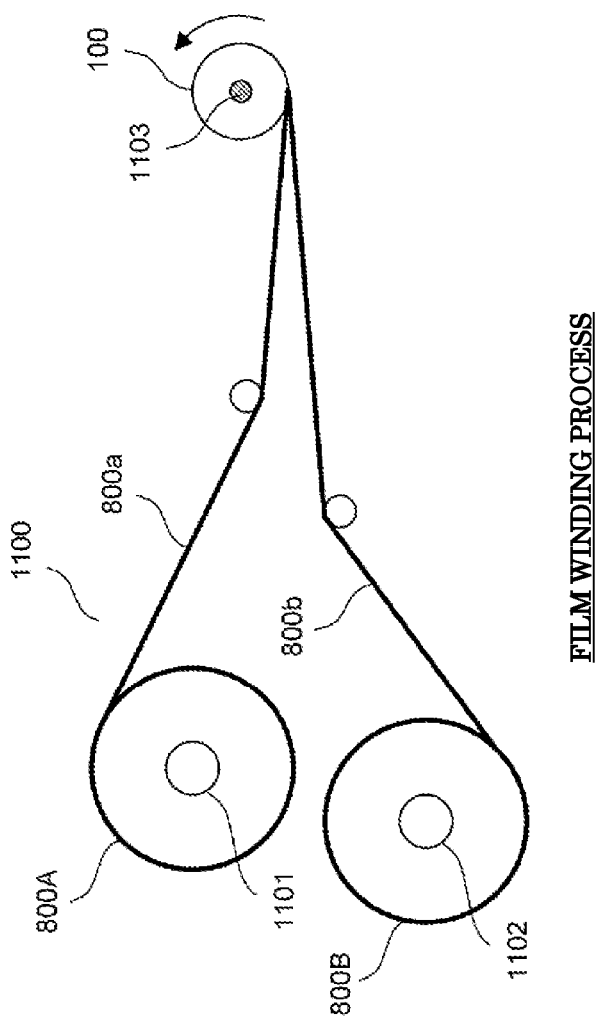
FIG. 12 is a view for describing a film winding process according to the first modification.

FIG. 11 is a view for describing producing processes of film capacitor 10 according to a first modification. FIG. 12 is a view for describing a film winding process according to the first modification.

In the method for producing film capacitor 10 according to the present modification, processes from the divided-film preparation process to the film winding process are modified from the above-described exemplary embodiment.

As illustrated in FIG. 11, in the divided-film preparation process, two low-angled strip films 600L or two high-angled strip films 600H are prepared. Note that, low-angled strip films 600L and high-angled strip films 600H may be taken out from identical raw film 500, or may be taken out from different raw films 500. When divided films 600 having an identical strip are taken out from identical raw film 500, divided film 600 taken out from an identical position in raw film 500 is divided into two films and those two films are rewound.

In the metal depositing process, similar to the above-described exemplary embodiment, first metal layer 700a is formed on an outer surface of first low-angled strip film 600L (high-angled strip film 600H) thus prepared. On the other hand, second metal layer 700b is formed on an inner surface corresponding to a rear surface of the surface formed with first metal layer 700a of first low-angled strip film 600L (high-angled strip film 600H), in second low-angled strip film 600L (high-angled strip film 600H) thus prepared. Note that, in deposition device 1000, second low-angled strip film 600L is set around unwinding shaft 1001 such that an inner surface of film 600a having been fed is directed outward in cooling drum 1003.

In the film cutting process, low-angled strip film 600L (high-angled strip film 600H) whose outer surface is formed with first metal layer 700a is subdivided with a width of film capacitor 10, to form a plurality of first subdivided films 800A. Furthermore, low-angled strip film 600L (high-angled strip film 600H) whose inner surface is formed with second metal layer 700b is subdivided with the width of film capacitor 10, to form a plurality of second subdivided films 800B.

In the capacitor winding process, as illustrated in FIG. 12, second subdivided film 800B is set around second unwinding shaft 1102 in an opposite manner to first subdivided film 800A set around first unwinding shaft 1101, in winding device 1100. First subdivided film 800A (film 800a) and second subdivided film 800B (film 800b) are fed such that the outer surface formed with first metal layer 700a and the inner surface formed with second metal layer 700b are directed toward the same direction. First subdivided film 800A and second subdivided film 800B are wound by winding shaft 1103 so that first metal layer 700a and second metal layer 700b, which are respectively formed on first subdivided film 800A and second subdivided film 800B, are positioned on an inner side of capacitor body 100. Further, in this process, second subdivided film 800B is stacked on an outer side of first subdivided film 800A, thereby forming capacitor body 100.

In the present modification, the exterior film covering process and processes subsequent to the exterior film covering process are the same as those in the above-described exemplary embodiment.

First film 120 and second film 140 are respectively formed from two low-angled strip films 600L (high-angled strip films 600H) that are identical low-angled strip film 600L (high-angled strip film 600H) but first metal layer 700a and second metal layer 700b are respectively formed on opposing surfaces. Therefore, first film 120 and second film 140 respectively have the orientation angle α and the orientation angle β having different signs from each other so as to be positive and negative, or vice versa. Accordingly, also in the method for producing film capacitor 10 of the present modification, film capacitor 10 in which signs of the orientation angle α of first film 120 and the orientation angle β of second film 140 are different from each other so as to be positive and negative, or vice versa, is produced.

<Second Modification of Method for Producing Film Capacitor>

FIG. 13 is a view for describing producing processes of film capacitor 10 according to a second modification.

In the method for producing film capacitor 10 according to the present modification, processes from the divided-film preparation process to the film winding process are modified from the above-described exemplary embodiment.

As illustrated in FIG. 13, in the divided-film preparation process, one low-angled strip films 600L or one high-angled strip films 600H is prepared.

In the metal depositing process, metal is deposited on an outer surface of low-angled strip film 600L (high-angled strip film 600H), and therefore first metal layers 700a extending along a longitudinal direction of low-angled strip film 600L (high-angled strip film 600H) with a width substantially equal to the width of film capacitor 10 are formed. Further metal is deposited on an inner surface of low-angled strip film 600L (high-angled strip film 600H) at positions that do not correspond to first metal layers 700a. Therefore second metal layers 700b extending along the longitudinal direction of low-angled strip film 600L (high-angled strip film 600H) with a width substantially equal to the width of film capacitor 10 are formed. Note that, in the metal depositing process of the present modification, instead of deposition device 1000 of the above-described exemplary embodiment, for example, a known deposition device capable of metal-depositing on both the inner surface and the outer surface of low-angled strip film 600L (high-angled strip film 600H), like a deposition device described in Unexamined Japanese Patent Publication No. 2016-015229, is used. In such a deposition device, units each configured with margin oil spray 1002, cooling drum 1003, and deposition unit 1004 as illustrated in FIG. 7A are provided at an anterior stage and a posterior stage. The unit at the anterior stage deposits metal on one surface of low-angled strip film 600L (high-angled strip film 600H), and the unit at the posterior stage deposits metal on the other surface of low-angled strip film 600L (high-angled strip film 600H).

In the film cutting process, low-angled strip film 600L (high-angled strip film 600H) whose outer and inner surfaces are formed with first metal layers 700a and second metal layers 700b in an alternated manner is subdivided to have the width of film capacitor 10. And a plurality of pairs of first subdivided films 800A whose outer surfaces are formed with first metal layers 700a and second subdivided films 800B whose inner surfaces are formed with second metal layers 700b are formed.

In the capacitor winding process, similar to the first modification, second subdivided film 800B is set around second unwinding shaft 1102 in an opposite manner to first subdivided film 800A set around first unwinding shaft 1101, in winding device 1100 (refer to FIG. 12). First subdivided film 800A (film 800a) and second subdivided film 800B (film 800b) are fed such that the outer surface formed with first metal layer 700a and the inner surface formed with second metal layer 700b are directed toward the same direction. First subdivided film 800A and second subdivided film 800B are wound by winding shaft 1103 so that first metal layer 700a and second metal layer 700b, which are respectively formed on first subdivided film 800A and second subdivided film 800B, are positioned on an inner side of capacitor body 100. Further, in this process, second subdivided film 800B is stacked on an outer side of first subdivided film 800A, thereby forming capacitor body 100.

In the present modification, the exterior film covering process and processes subsequent to the exterior film covering process are the same as those in the above-described exemplary embodiment.

First film 120 and second film 140 are formed from one low-angled strip film 600L (high-angled strip film 600H) whose opposing surfaces are respectively formed with first metal layer 700a and second metal layer 700b. Therefore, first film 120 and second film 140 respectively have the orientation angle $\alpha$ and the orientation angle $\beta$ having different signs from each other so as to be positive and negative, or vice versa. Accordingly, also in the method for producing film capacitor 10 of the present modification, film capacitor 10 in which signs of the orientation angle $\alpha$ of first film 120 and the orientation angle $\beta$ of second film 140 are different from each other so as to be positive and negative, or vice versa, is produced.

<Other Modifications>

In the above-described exemplary embodiment, the orientation angle a of first film 120 and the orientation angle $\beta$ of second film 140 are set different in sign from each other. However, when a relationship between the orientation angle $\alpha$ and the orientation angle $\beta$ satisfies $-20°<\alpha+\beta<+20°$, the orientation angle $\alpha$ and the orientation angle $\beta$ may have an identical sign. A case when an absolute value of the sum of the orientation angle $\alpha$ and the orientation angle $\beta$ ($|\alpha+\beta|$) is suppressed is similar to the form of film capacitor 10 in FIG. 10B in which an absolute value of the sum of the orientation angle $\alpha$ and the orientation angle $\beta$ is substantially 0°, rather than the form of film capacitor 10 in FIGS. 10A and 10C in which an absolute value of the sum of the orientation angle $\alpha$ and the orientation angle $\beta$ is large. Therefore, the effect for suppressing the irregular deformation of film capacitor 10 when exposed to high temperature can be expected. Note that, in this case, it is desirable that the relationship between the orientation angle $\alpha$ and the orientation angle $\beta$ further satisfy $\alpha-\beta<-5°$ or $+5°<\alpha-\beta$. When such film capacitor 10 is produced, the divided-film preparation process in the production method according to the above-described exemplary embodiment is modified, and two divided films 600 different in strip from each other are simply prepared.

In the above-described exemplary embodiment, film capacitor 10 includes capacitor body 100 configured by stacking and winding first film 120 formed with first metal layer 110 and second film 140 formed with second metal layer 130. However, film capacitor 10 may include capacitor body 100 configured by stacking and laminating first film 120 formed with first metal layer 110 and second film 140 formed with second metal layer 130. In this case, in the production method of the above-described exemplary embodiment, the film winding process is modified to a known forming process of capacitor body 100 for producing capacitor body 100 of a lamination type.

In the above-described exemplary embodiment, in capacitor unit 1, the plurality of film capacitors 10 are accommodated in case 40 in a state in which both end surfaces of each film capacitor 10 are vertically (along a direction toward which case 40 opens) aligned. However, the present invention is not limited to this configuration. Film capacitor 10 may be accommodated in case 40 in a state in which both end surfaces of film capacitor 10 are directed along a right-left direction (along a direction perpendicular to the direction toward which case 40 opens).

In addition, the exemplary embodiment of the present invention can be modified in various ways as appropriate within the scope of the technical idea disclosed in the claims.

The present invention is useful for a film capacitor used for various electronic devices, electric devices, industrial devices, vehicular electrical equipment, and other devices, a capacitor unit provided with such a film capacitor, and a method for producing such a film capacitor.

What is claimed is:

1. A film capacitor having a first end surface and a second end surface that are parallel to each other, the film capacitor comprising:
   a first electrode disposed at the first end surface;
   a second electrode disposed at the second end surface;
   a first metal layer connected to the first electrode;
   a first film connected to the first electrode and the second electrode, the first film including resin;
   a second metal layer connected to the second electrode; and
   a second film connected to the first electrode and the second electrode, the second film including resin,
   the first metal layer, the first film, the second metal layer, and the second film being wound in a stacked state in this order or laminated in this order,
   wherein
   an orientation angle $\alpha$ of the first film and an orientation angle $\beta$ of the second film are different in sign from each other,
   the orientation angle being defined by an acute angle between an orientation principle axis of the first film or the second film and a reference direction that is parallel to the first end surface and the second end surface in a film plane parallel to a main surface of the first film or the second film, a sign of the orientation angle which represents rotation from the reference direction to one side being defined to be positive, a sign of the orientation angle which represents rotation from the reference direction to the other side being defined to be negative, when portions of the first film and the second film which face each other via the second metal layer are viewed in an direction perpendicular to the film plane.

2. The film capacitor according to claim 1, wherein the first metal layer is disposed on a surface of the first film, and the second metal layer is disposed on a surface of the second film.

3. The film capacitor according to claim 1, wherein the relationship between the orientation angle $\alpha$ of the first film and the orientation angle $\beta$ of the second film further satisfies $$\alpha-\beta<-5°, \text{ or } +5°<\alpha-\beta.$$

4. A capacitor unit comprising:
the film capacitor according to claim 1;
a first bus bar and a second bus bar respectively connected to the first electrode and the second electrode of the film capacitor;
a case accommodating the film capacitor, the first bus bar, and the second bus bar; and
a filling resin filled in the case, the filling resin having a thermosetting property.

\* \* \* \* \*